United States Patent [19]
Allport

[11] 3,721,888
[45] March 20, 1973

[54] BATTERY CHARGING SYSTEMS FOR ROAD VEHICLES

[75] Inventor: Maurice James Allport, Stourbridge, England

[73] Assignee: Joseph Lucas (Industries) Limited, Birmingham, England

[22] Filed: July 27, 1971

[21] Appl. No.: 166,439

[52] U.S. Cl. ..................320/64, 322/28, 322/60, 322/73
[51] Int. Cl. ..............................H02p 9/30
[58] Field of Search .........322/28, 73, 80, 60; 320/64

[56] References Cited

UNITED STATES PATENTS 3,364,416  1/1968  Kirk et al............................322/28 X
3,539,907  11/1970  Linstedt..............................322/73 X Primary Examiner—J. D. Miller
Assistant Examiner—H. Huberfeld
Attorney—Holman & Stern

[57] ABSTRACT

A battery charging system for a road vehicle has a three-phase wound field alternator for charging the vehicle battery. There are three thyristors with their cathodes connected to the phase points of the alternator and their anodes connected to the positive battery terminals through the field winding of the alternator, an means sensitive to the battery voltage for providing gate current to the thyristors only when the battery voltage is below a predetermined value.

3 Claims, 1 Drawing Figure

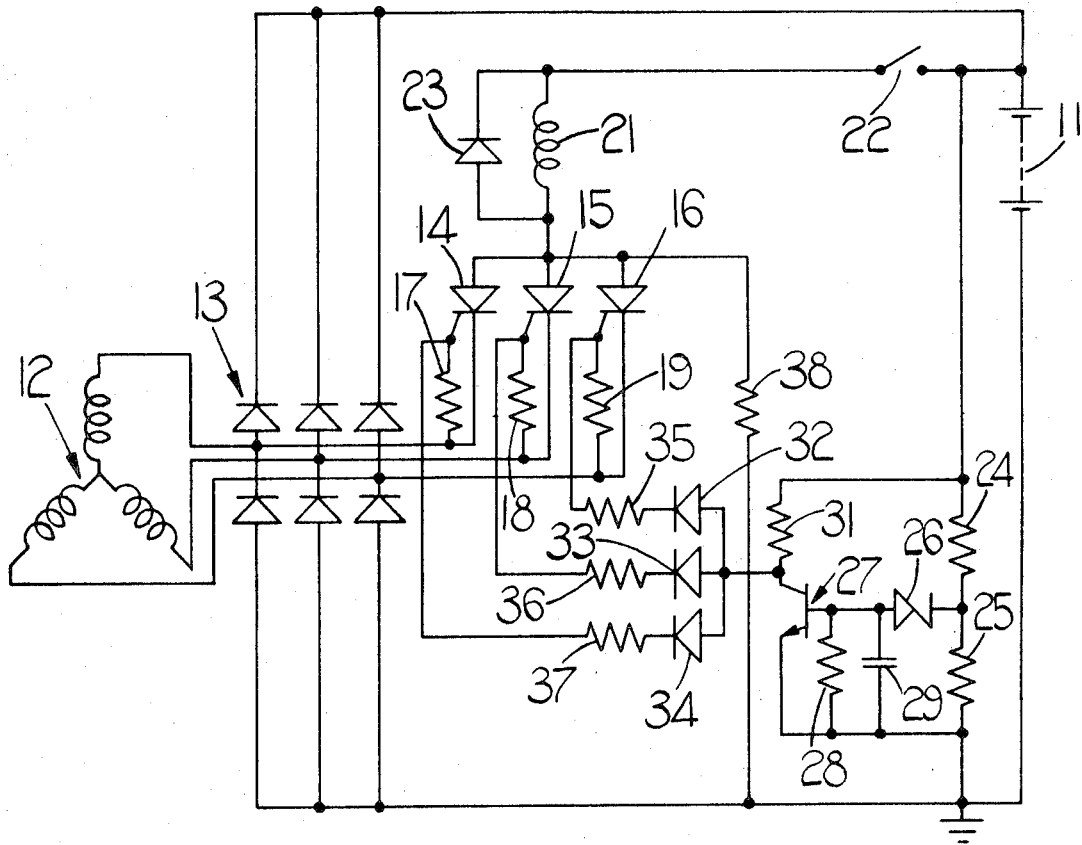

BATTERY CHARGING SYSTEMS FOR ROAD VEHICLES

This invention relates to battery charging systems for road vehicles.

A system according to the invention includes a three phase wound field alternator charging the vehicle battery, three thyristors having their cathodes connected to the phase points of the alternator, their anodes connected to the positive battery terminal through the field winding of the alternator, and means sensitive to the battery voltage for providing gate current to the thyristors only when the battery voltage is below a predetermined value.

Preferably, the gate of each thyristor is connected through a resistor to the same phase point as the cathode of the thyristor, so that the gates are reverse biased by the alternator when the battery voltage is above the predetermined value.

A resistive path may be provided for energizing the field winding on starting.

The accompanying drawing is a circuit diagram illustrating one example of the invention.

Referring to the drawing, the vehicle battery 11 has its negative terminal earthed, and is charged by a three phase wound field alternator through a full wave rectifier 13. The phase points of the alternator 12 are connected to the cathodes of three thyristors 14, 15, 16, the gates of which are connected to the same phase points as the respective cathodes through resistors 17, 18 and 19 respectively. The anodes of the thyristors are connected to the positive battery terminal through the field winding 21 of the alternator and the ignition switch 22 of the vehicle in series, the winding 21 being bridged by a diode 23 in the usual way.

Connected across the battery 11 are a pair of resistors 24, 25, the junction of which is connected through a Zener diode 26 to the base of an n-p-n transistor 27, the emitter of which is connected to the negative battery terminal and the collector of which is connected through a resistor 31 to the positive battery terminal. The base and emitter of the transistor 27 are interconnected through a resistor 28 and a capacitor 29 in parallel, and the collector of the transistor 27 is connected to the anodes of three diodes 32, 33, 34, the cathodes of which are connected through a resistor 35, 36, 37 to the gates of the thyristors 14, 15 16.

Assuming that the battery voltage is below a predetermined value, the Zener diode 26 does not conduct and current flows through the resistor 31 to the gates of the thyristors 14, 15, 16, which conducts when they are forward biased to energize the winding 21. The alternator 12 charges the battery 11 through the full wave rectifier. When a predetermined voltage is reached, the Zener diode 26 conducts to cause the transistor 27 to conduct, and remove gate current from the thyristors 14, 15, 16, each of which turns off as soon as it is reverse biased, so that current flow in the field winding 21 ceases.

The voltage at which regulation commences is set by the resistor 25, and the capacitor 29 suppresses transients which would otherwise appear on the base of the transistor 27. The resistor 28 sets the operating current of the Zener diode 26, and the resistors 35, 36, 37 are provided to minimize the difference in gate-cathode voltages required to fire the thyristors 14, 15 16.

The purposes of the resistors 17, 18, 19 is to reverse bias the gate-cathode paths of the thyristors 14, 15, 16 when the transistor 27 is on, so minimizing the risk of the thyristors 14, 15, 16 being turned on by transients.

Finally, a resistor 38 is connected between the negative battery terminal and the anodes of the thyristors 14, 15, 16, to provide excitation of the winding 21 when the ignition switch 22 is closed.

I claim:

1. A battery charging system for a road vehicle including a three phase wound field alternator charging the vehicle battery, three thyristors having their cathodes connected to the phase points of the alternator, their anodes connected to the positive battery terminal through the field winding of the alternator, and means sensitive to the battery voltage for providing gate current to the thyristors only when the battery voltage is below a predetermined value.

2. A system as claimed in claim 1 in which the gate of each thyristor is connected through a resistor to the same phase point as the cathode of the thyristor, so that the gates are reverse biased by the alternator when the battery voltage is above the predetermined value.

3. A system as claimed in claim 1 including a resistive path for energizing the field winding on starting.

* * * * *